Aug. 1, 1961         B. NIEDERMAN         2,994,844
                     FILTER CONSTRUCTION
Filed Oct. 15, 1958                    3 Sheets-Sheet 1
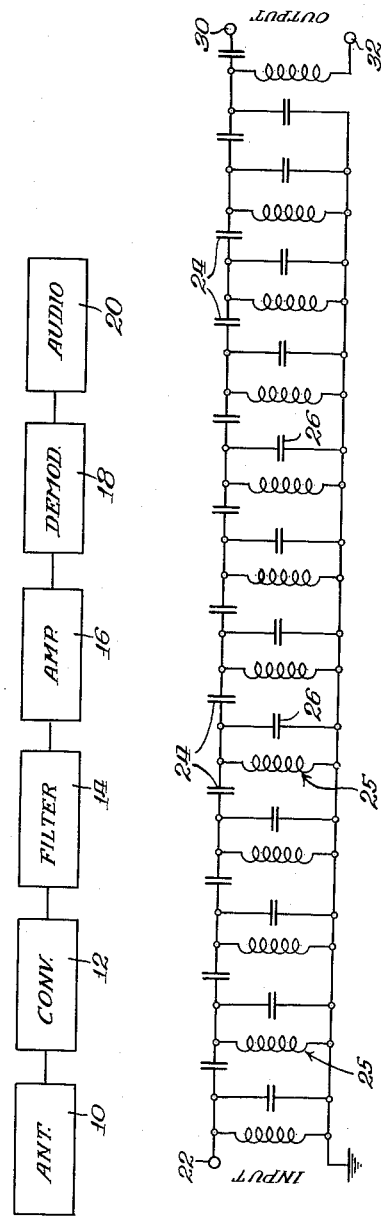
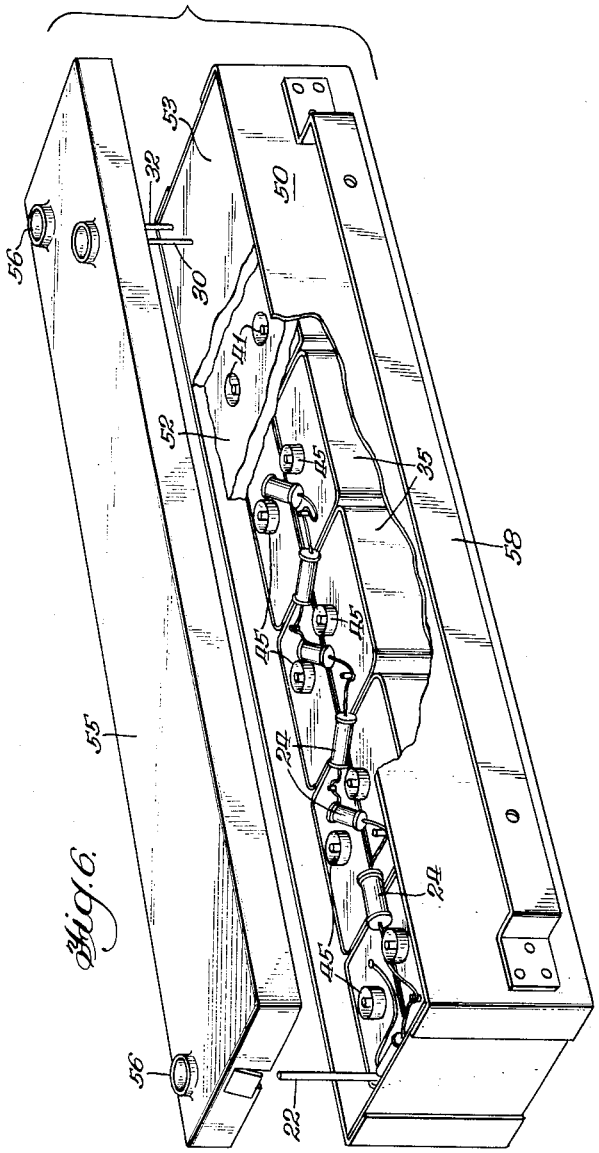
INVENTOR.
Bernard Niederman
BY
Mueller & Aichele
Attys.

Aug. 1, 1961  B. NIEDERMAN  2,994,844
FILTER CONSTRUCTION
Filed Oct. 15, 1958  3 Sheets-Sheet 2

INVENTOR.
Bernard Niederman
BY
Mueller & Aichele
Attys.

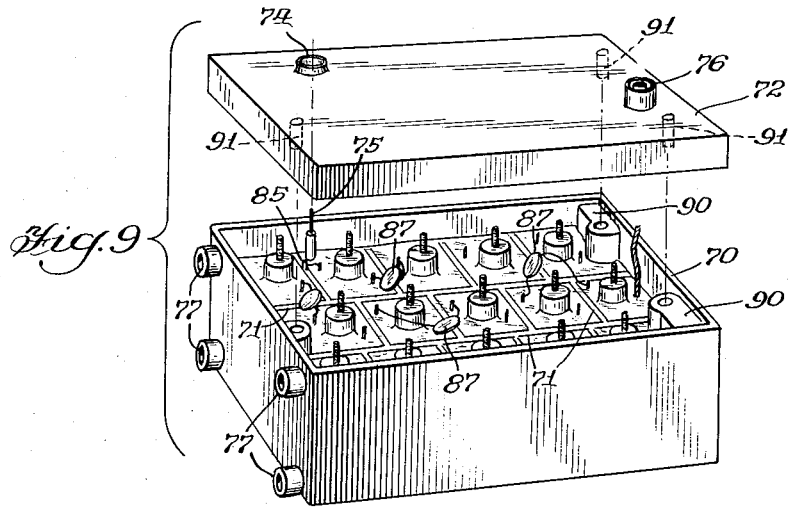

United States Patent Office 2,994,844
Patented Aug. 1, 1961

2,994,844
FILTER CONSTRUCTION
Bernard Niederman, Chicago, Ill., assignor to Motorola, Inc., Chicago, Ill., a corporation of Illinois
Filed Oct. 15, 1958, Ser. No. 767,481
5 Claims. (Cl. 333—70)

This invention relates generally to electric wave filters and more particularly to an improved sealed filter construction and the method of making the same. This application is a continuation in part of application Serial No. 587,412 filed May 25, 1956, now abandoned.

The use of filter circuits including resistive and reactive elements connected to provide a predetermined frequency response is well known. However, to retain the desired frequency response, the values of the components making up the filter must remain constant. It is well known that such components tend to change their characteristics with age and particularly in the presence of heat, humidity and mechanical shock and vibration.

In my Patent No. 2,738,466 issued March 13, 1956, there is disclosed a sealed filter wherein the components are sealed in molded plastic material so that they tend to retain their characteristics after long periods of use. Another such construction is illustrated in the copending application Serial No. 436,910 filed June 15, 1954, of Bernard Niederman and Leonard G. Chase, now Patent No. 2,888,652. Structures in accordance with the above patent and application have been highly successful in commercial use. The present invention is directed to an improvement and simplification of the construction of such sealed filters and an improved method making it possible to adjust the characteristics of the filter during the final construction steps to provide highly accurate frequency response characteristics.

It is an object of the present invention to provide an improved sealed filter construction wherein the electrical characteristics of the filter remain fixed during various conditions of use.

A further object of the invention is to provide an improved sealed filter which is of compact and inexpensive construction.

Another object of the invention is to provide an improved coil unit having a mounting for the movable core thereof which facilitates adjustment of the core during the construction of a sealed filter including the coil.

A still further object of the invention is to provide an improved method for constructing a sealed filter wherein adjustment of the components is provided after the filter is substantially completely sealed.

Still another object of the invention is to provide a method of making a sealed filter wherein the characteristics and the effectiveness of the sealing material are improved.

A feature of the invention is the provision of a sealed filter construction which includes coils having adjustable cores therein with tubes extending from the coil forms providing access for adjustment of the cores after the filter element has been surrounded by plastic sealing material.

A further feature of the invention is the provision of an improved coil structure wherein a nipple is provided on the coil form which has a threaded opening for supporting the mounting rod for a core and which has a cylindrical shoulder for receiving a tube to hold sealing material away from the mounting rod.

Another feature of the invention is the provision of an improved filter structure including a die cast conducting housing having partitions forming cavities for receiving individual filter sections which are individually sealed and then interconnected and aligned and the entire filter is thereafter sealed.

A still further feature of the invention is the provision of an improved method for constructing a sealed filter wherein a plurality of pre-sealed sections are provided in a housing and coupled together, the sections and coupling elements sealed, the elements of the sections thereafter adjusted to provide the desired characteristic, and the adjustable elements then being fixed to complete the sealed filter structure.

Another feature of the invention is the provision of an improved method of making a sealed filter wherein a vacuum is used to draw air and moisture from the sealing material and to cause the sealing material to better penetrate the elements of the filter.

Further objects, features and the attending advantages of the invention will be apparent from a consideration of the following description when taken in connection with the accompanying dawings in which:

FIG. 1 is a block diagram of a receiver circuit using a sealed band pass filter construction in accordance with the invention;

FIG. 2 is a circuit diagram of a filter in accordance with the invention;

Figure 4:
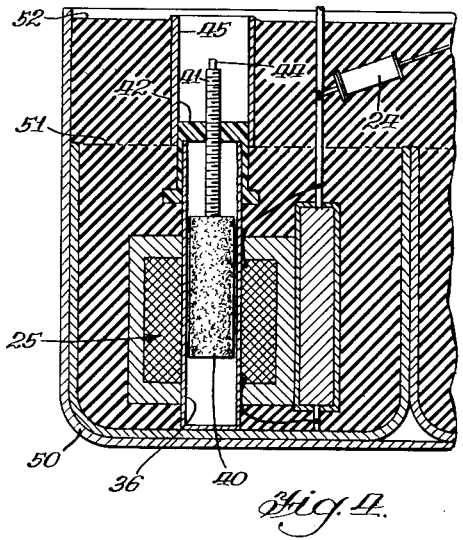
Figure 5:
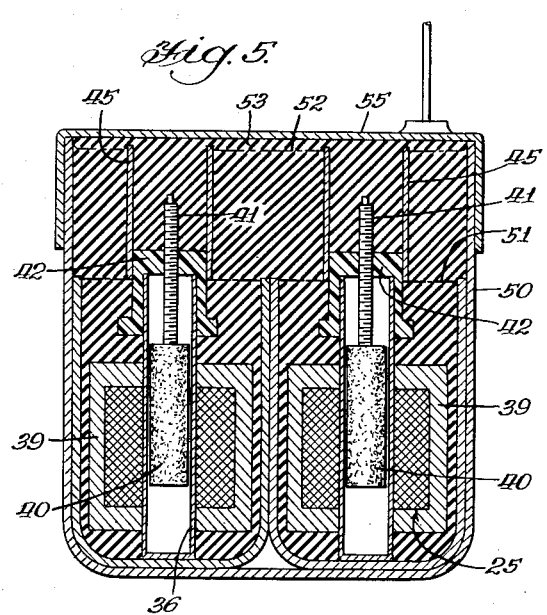
Figure 7:
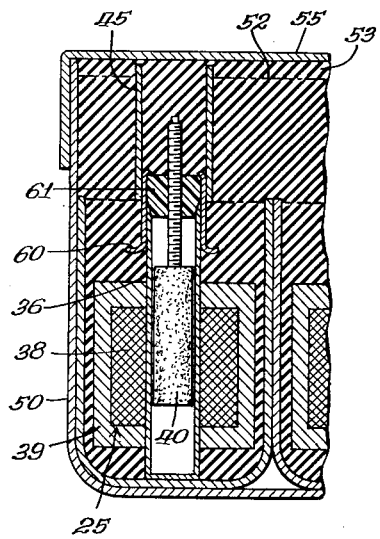
Figure 8:
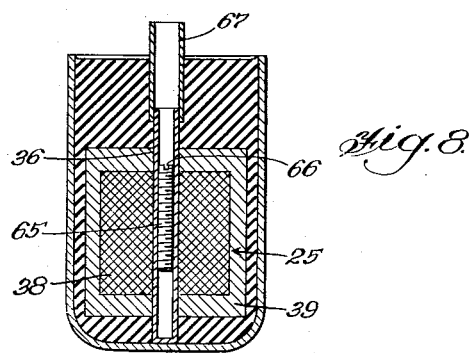

FIGS. 4, 5, and 6 illustrate the construction of a multi-section filter in accordance with the invention;

FIGS. 7 and 8 illustrate alternate constructions of the sections of the filter;

FIG. 9 is a perspective view of a filter in a cast housing; and

FIGS. 10, 11 and 12 are cross section views showing the filter of FIG. 9 in different stages of production.

In practicing the invention there is provided an improved filter structure which includes a plurality of individual filter sections. Each filter section includes a coil and a condenser in a shielding casing. The casings may be rectangular in shape to house a coil and condenser in a minimum of space. Individual casings may be provided for each section, or a die cast casing having partitions forming individual cavities for the sections may be used. The coil includes a coil form on which a winding is provided and in which a core is movably positioned. A nipple structure may be provided on the coil form having a threaded opening in which the core mounting rod is adjustably mounted. Alternatively, the core may be threaded directly in the coil form to provide an adjustable mounting therefor. The coil and condenser are connected together as a sub-assembly and may be placed in the casing or cavity into which plastic sealing material has already been provided, or the sealing material may be provided in the sections after the coil and condenser assembly is placed therein. The nipple structure cooperates with the coil form to hold the plastic material away from the core and core mounting rod. A tubular member for holding plastic material from the core and for providing access to the core may be supported on the nipple about the mounting rod for the core, after the individual sections are sealed. Or, such a tubular member may be placed about the end of the coil form when the core is threaded directly in the coil form.

In the event that individual casings are used for the individual sections, a plurality of casings may be provided in a housing and interconnected by coupling elements such as coupling condensers positioned above the sections. When a single cast housing is used the sections provided in the cavities may be similarly connected. Further plastic material may then be introduced into the housing for completely sealing the sections and the coupling elements connected thereto. The nipple structures, and/or the tubular members, extend to a height such that they hold the plastic material from the core and the mounting rod thereof. The cores may be adjusted to provide the desired filter characteristics, which remain substantially fixed since the elements of the filter are substantially entirely sealed. After the cores are adjusted to provide the desired characteristics, further plastic material may be introduced into the housing and allowed to completely fix the positions of the cores. The plastic material engages the core mounting rods in constructions having such rods, and directly engages the cores where the cores are threaded in the coil forms.

Referring now to the drawings, FIG. 1 illustrates one application for use of a sealed filter in accordance with the invention. This is a superheterodyne receiver which may be used in mobile applications wherein vibration and shock are encountered and which may be subjected to various conditions of temperature and humidity. The receiver includes an antenna system 10 for intercepting and selecting waves of a desired frequency. The waves are reduced to lower frequency as required in a superheterodyne receiver by converter 12 which may include one or more stages of frequency conversion. The output of the converter is fed to the filter 14 which is a passive band pass filter for selecting a predetermined band of frequencies. This filter is formed by the filter construction in accordance with the invention, and is arranged to pass a particular frequency band and substantially attenuate all frequencies outside the band. As stated above it is desired that this filter control the selectivity characteristics of the entire receiver and it is therefore desired that the selectivity characteristics of the filter remain fixed for a long period of time and in the presence of various conditions which tend to cause deterioration of electrical components. The output of the filter is amplified by amplifier 16 to increase the gain of the signal to a value such that the modulation may be derived therefrom. This is accomplished in the demodulator 18 which may be of various different types depending upon the type of modulation which the receiver is used to receive. The modulator produces an audio output which may be amplified and reproduced in any desired manner by the audio equipment represented by the reference number 20.

Considering now FIG. 2 which shows the electrical circuit of the filter, this filter is illustrated as including a plurality of sections each including a coil 25 and a condenser 26. These sections are connected together by coupling elements illustrated as condensers 24. The filter illustrated includes 12 sections but it is to be pointed out that any number of sections required to provide a particular frequency response characteristic may be used. It is to be noted that other more complicated circuit configurations may be used and that the coupling elements may include elements other than condensers such as tubes. The output of the filter is derived from the output terminals 30 and 32, with the connection shown providing a low impedance output as is required when using the circuit with transistors. Other known filter terminations may be used with a termination similar to the input providing a high impedance output as may be required for connection to vacuum tubes.

Figure 3:
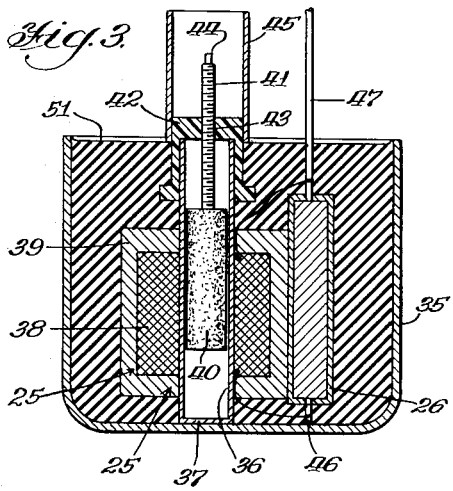
FIG. 3 is a cross-sectional view of a snigle filter section in accordance with the invention.

FIGS. 3, 4, 5 and 6 illustrate more specifically the construction of the filter in accordance with the invention. FIG. 3 shows a single filter section including a coil 25 and a condenser 26 which are provided in a shielding casing 35. The coil 25 includes a coil form 36 having a closed bottom 37. A winding 38 is provided on the coil form about which a magnetic shell 39 is positioned. A magnetic core 40 is provided within the coil form 36 and includes a threaded mounting rod 41 for supporting the same. A plastic nipple 42 is positioned over the upper end of the coil form 36 and has a threaded opening 43 therein for receiving the mounting rod 41 of the core 40. The rod 41 may have a flat end 44 to be engaged by a tool for rotating the mounting rod 41 and thereby adjusting the position of the core 40.

As illustrated in FIG. 2 the winding 38 of the coil 25 and the condenser 26 are connected in parallel. The lower common terminal 46 for the coil and condenser is connected to the shielding casing 35 to provide a ground connection to the filter section. The upper common terminals are connected to a conductor 47 which extends above the filter section and to which connections are made to connect a plurality of sections in a filter circuit as will be further described.

The coil and condenser are sealed by plastic material within the casing. The coil and condenser may be provided in the casing first and the plastic material in liquid form introduced thereafter, or the plastic material in liquid form may be introduced in the casing first and the coil and condenser immersed therein. In either case, the plastic material is sufficiently fluid to completely surround the coil and condenser and to enter any spaces between the magnetic shell 39 and the coil form 36 to completely seal the winding 38. This fixes the position of the turns of the winding 38 and seals the same against the entrance of moisture. The turns are held in fixed position when expansion or contraction thereof takes place. As the plastic material completely surrounds the lower end of the nipple 42, this member is held in fixed position, and the coil form 36 is engaged by the plastic material both above and below the magnetic shell 39 to hold the form in fixed position.

After the sections are individually sealed, and the plastic material hardened, the sections may be stored for future use or may be immediately used in forming multi-section filters. FIG. 4 illustrates a filter construction having a housing 50 in which a plurality of filter sections are positioned. The dot-dash line 51 represents the level of the plastic material in the individual filter sections. The sections are then interconnected by the coupling capacitors 24 to form a complete filter circuit. After the sections are connected, additional plastic material is introduced in the housing 50 to fill the housing to the level indicated at 52. Prior to the introduction of the additional plastic material tubular members 45 are positioned on the nipples 42 to hold the plastic material away from the core and mounting rod therefor. It is to be noted that the level of the plastic material is below the top of the tubular members 45 which are mounted on the nipples 42. The tubular members 45 provide access to the ends 44 of the mounting rods 41 so that the position of the cores 40 may be changed to change the inductance of the coils 25. This makes it possible to adjust the characteristics of the filter after the individual sealed sections are positioned together and further sealed together and the coupling elements are also sealed. The tubular members 45 may be pulled out after the second sealing step or may be left in position in the completed filter.

After the filters are adjusted to provide the desired characteristic additional plastic material 53 is introduced in the housing 50 to completely fill the same and to enter the tubular members 45. This is illustrated in FIG. 5 wherein plastic material is provided above the level 52 shown in FIG. 4. The plastic material in the tubular members 45 completely fills the space above the nipple 42 and surrounds the portions of the mounting rods 41 above the nipple to hold the rods against rotary movement so that the core 40 remains in fixed position. As previously stated, the nipple and coil form are secured in fixed position when the individual sections are first sealed. Accordingly, the position of the core with respect to the winding is positively fixed so that vibration and shock and changing conditions will not alter the same.

A shielding cover 55 may be placed on the housing 50 to provide a completely enclosed housing and shield about the filter construction. FIG. 6 shows more clearly the over-all filter construction wherein the individual casings 35 are provided in the housing 50. The left hand portion of this figure shows the sections before additional plastic material is poured thereon and shows the tubular members 45 extending therefrom. The right central part of the figure shows plastic material at the level 52 wherein the tubular members 45 still hold the plastic away from the core mounting rods 41. The extreme right portion of the figure shows the top layer of plastic material 53 which completely seals the top and enters the tubular members 45 to fix the position of the core mounting rods 41. Openings 56 are provided in the cover 55 for the connectors of the filter, including the input connector 22 and the output connectors 30 and 32. The input is applied between connector 22 and ground which is provided by the housing, and the output is taken from between connectors 30 and 32. In order to provide a low impedance output for the filter two separate output connectors are required. It is to be pointed out however, that only one connector may be required to provide a high impedance output to ground. A bracket 58 is secured to the housing 50 to provide a mounting for the filter unit.

FIG. 7 illustrates a somewhat different embodiment of the filter construction wherein the nipple for supporting the core mounting rod on the coil form is of a different construction. In this construction, a metal sleeve 60 fits over the coil form 36 and a plastic insert 61 secured within the sleeve has a tapered portion which fits into the top of the coil form 36. This two piece nipple construction may be mounted securely on the coil form and the insert is threaded to provide an adjustable mounting for the core mounting rod. The plastic material flows about the bottom of the sleeve to hold the same in fixed position. The tubular member 45 fits about the sleeve 60 in essentially the same manner as about the nipple 42 in the prior embodiments.

FIG. 8 shows a still further embodiment wherein the core 65 is threaded directly in the coil form 36. Projections may be formed on the coil form with which threads on the core cooperate. The top of the core may include a slot 66 for engagement by a screwdriver to change the position of the core. The tubular member 67 fits about the top of the coil form 36 to provide a tubular extension which holds the plastic material away from the core and provides access to the screwdriver slot in the top of the core.

FIG. 9 illustrates a filter construction in accordance with the invention in which a one piece housing 70 is used. This housing may be die-cast from aluminum or other conducting material as an integral unit with partitions 71 therein which form separate cavities 73 for the individual sections of the filter. The partitions 71 extend from the bottom surface of the housing about two-thirds of the distance to the top. A cover 72 is provided for the housing and has an opening 74 through which the input lead 75 may extend, and a coaxial connector 76 thereon for the output signal from the filter. Bosses 77 are provided at one end of the housing for mounting the filter on a chassis or the like. The filter unit of FIG. 9 is quite compact and when mounted with the longer dimension extending from the chassis takes up a minimum of space on the chassis.

FIGS. 10 to 12 show the construction of the filter sections which include a coil 80, generally similar to the coil 25 of FIG. 3, and a capacitor 81. The capacitor 81 is positioned below the coil in the cavity 73. The coil and condenser are first connected together as a sub-assembly and this may be provided by using a plastic material as shown at 82 in FIG. 11 to cement the condenser 81 to the bottom of the coil 80. The coil unit includes a nipple structure 42 as illustrated in FIGS. 3 to 6 and this is secured to the coil form 36 and magnetic shell 39 by plastic material to hold the nipple in place during the assembly operation. Alternately the coil and capacitor may be connected to form a sub-assembly by the use of tape or other securing means. The coil and capacitor when pre-assembled are electrically connected in parallel and are tested and adjusted to provide the required characteristics. Sections which are not satisfactory are rejected so that it will not be necessary to reject the entire filter in which they are placed.

In the construction of the filter, plastic material in a liquid state is placed in the cavities 73 to a level such as shown in FIG. 10. The filter section sub-assemblies are then placed in the plastic material and the plastic material flows around the capacitor and coil to penetrate the same. Although the magnetic shell 39 extends about the coil proper, there are spaces in the shell for the leads which permit the plastic material to enter the shell and completely surround the coil. The amount of plastic material in the cavities is such that when the sections are positioned therein the plastic will still be at a level below the top surfaces of the partitions 71.

Projections 85 are provided along the top surfaces of the partitions 71 to facilitate connecting the grounded side of the coil and condenser thereto. This is illustrated in FIG. 10 which shows conductor 86 connected to the condenser 81 and the coil 80, and soldered or otherwise connected to the projection 85. Inasmuch as the plastic is at a level below the top of the partition this soldering operation is facilitated. As the cast housing is made of a conducting material, ground connections to the filter sections are made through the housing itself.

After the ground leads are connected, further plastic material is introduced in the housing to a level extending over the tops of the partitions 71 as shown in FIG. 11. This insures that the coil is completely surrounded. The plastic material also surrounds the nipple structure 42 at a level below the top thereof, and in particular engaging the rim 42a. The unit is then placed in a partial vacuum so that air bubbles are removed from the plastic, and it is allowed to set and cure so that the plastic hardens. The individual sections as sealed may again be tested and preadjusted.

After the plastic is cured, the individual filter sections are interconnected by the coupling capacitors 87 to form a filter circuit generally like that shown in FIG. 2. The plastic is further cured and subjected to vigorous temperature cycles for aging the filter. The temperature is taken up to 80° C. for a time, then brought down to room temperature, and then lowered to a temperature of —40° C. The cycle may be repeated a number of times to thoroughly age the unit. After the aging the complete filter is tested and aligned to provide the desired characteristics. It will be apparent that the adjusting screws for the cores of the filters are still accessible and the cores are free to move so that adjustment can be provided. FIG. 9 shows the filter in the condition for final adjustment. The nipples 42 which support the cores are firmly imbedded in the plastic material so that they are held rigid with respect to the coils and there can be no shifting in position which will change the characteristics of the filter.

The cover 72 is then placed on the completely sealed structure, and may have projections 89 extending from the lower surface thereof into the plastic for holding the cover in place. Bosses 90 may be provided on the housing 70 to receive pins 91 extending from the cover 72 to better position and secure the cover on the housing.

Although various plastic materials may be used, as the sealing material in the construction described, it has been found that polyester styrene resin is particularly suitable. A filler such as silica flour has been found to reduce shrinkage of the plastic material, improves the resistance thereof to injury resulting from vibration, and improves the heat conductivity. This material is completely impregnable to moisture and fungus and is a good heat conductor. The material is very tough and when properly treated it will not crack or break due to vibration even after long periods of use.

It is desirable to remove all air and moisture from the plastic material and this may be accomplished by drawing a partial vacuum above the plastic material when in its liquid form before it is introduced into the casing and the housing of the filter. Then after the plastic is poured a vacuum may be drawn above the casing to cause the plastic to penetrate the coil to a greater extent. This is particularly important when used after the first pouring of the plastic about the coil.

The units constructed in accordance with the invention have been found to have characteristics which remain fixed for long periods of time when subjected to extremely rough usage. The sealing material not only anchors all of the components of the filter including the adjustable cores and the turns of the wires but seals the same from moisture and other foreign materials. The plastic seals the various sections together to provide a completely solid and rigid structure.

The improved method wherein the individual sections are first sealed, then coupled together with the sections further sealed together and imbedded in plastic material and then adjusted makes it possible to provide the desired characteristics with extremely precise accuracy. This cuts down the number of rejects to thereby reduce the cost so that the cost of the completed unit is relatively low. The final sealing step then holds the values fixed and completely seals the filter produced. The individual sections may be preformed in separate casings which can be combined to provide various filter constructions. Alternately the sections may be provided in cavities in a single housing structure to provide a very compact unit. Filters having any desired number of sections to provide the desired response characteristics can be provided.

I claim:

1. A sealed filter structure including in combination, conducting housing means including conducting partitions forming a plurality of shielding cavities, a plurality of filter sections in said cavities each including condenser means and coil means, said coil means each having a tubular form and a core movable therein, a single unitary molded insulating member positioned at one end of each of said forms respectively, said cavities having open sides and said coil means being positioned therein with said insulating members extending from said open sides, each of said insulating members having a cylindrical portion about said one end of said form with an outwardly extending radial rim thereon and a central portion having an aperture therein extending from said end of said form, said core having a threaded rod extending therefrom and threaded in said aperture of said central portion to adjust the position of said core with respect to said form, plastic material within each cavity about said coil means therein for sealing the same, said plastic material completely filling said cavities up to a level below the top of said insulating member and encompassing said rim portion of said insulating member to hold the same in fixed position with respect to said housing means, circuit means connected to said condenser means and said coil means to form a filter circuit, said tubular forms and said insulating members holding said plastic material from said cores and said rods of said coil means, so that the position of said cores is adjustable by adjustment of said threaded rods to align the filter circuit, and additional plastic material in said housing means about and above said insulating members and about said threaded rods for fixing the position thereof and thereby fixing the position of said cores.

2. A filter structure in accordance with claim 1 wherein said additional plastic material includes a first layer surrounding said circuit means to seal and fix the position of the same, and a second layer which engages said threaded rods and fixes the position thereof.

3. A filter structure in accordance with claim 2 including tubular protecting means positioned on said insulating member of at least one filter section and extending about said threaded rod thereof for holding the first layer of plastic material therefrom, with the second layer of plastic material extending into said tubular means to fix the position of said rod.

4. A filter structure in accordance with claim 1 wherein said housing means includes a plurality of individual conducting casings each containing one filter section and a conducting housing containing a plurality of casings with filter sections therein.

5. A filter structure in accordance with claim 1 wherein said housing means includes a die-cast conducting structure having integral partitions forming the shielding cavities.

References Cited in the file of this patent

UNITED STATES PATENTS

| | | |
|---|---|---|
| 2,014,521 | Casper | Sept. 17, 1935 |
| 2,163,775 | Conklin | June 27, 1939 |
| 2,213,326 | Polydoroff et al. | Sept. 3, 1940 |
| 2,386,692 | Kuenstler | Oct. 9, 1945 |
| 2,391,038 | Rifenbergh | Dec. 18, 1945 |
| 2,483,801 | Becwar | Oct. 4, 1949 |
| 2,623,101 | Kurland et al. | Dec. 23, 1952 |
| 2,738,466 | Niederman | Mar. 13, 1956 |
| 2,743,308 | Bardsley | Apr. 24, 1956 |
| 2,888,652 | Niederman et al. | May 26, 1959 |

OTHER REFERENCES

Wentz et al.: Trans. A.I.E.E., vol. 71, part III, January 1952, pages 358–363.